(12) United States Patent
Suzuki et al.

(10) Patent No.: US 8,844,348 B2
(45) Date of Patent: Sep. 30, 2014

(54) GAS FLOW RATE MEASUREMENT DEVICE

(75) Inventors: Kazunori Suzuki, Hitachinaka (JP); Ryo Sato, Hitachinaka (JP); Keiji Hanzawa, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 19 days.

(21) Appl. No.: 13/817,889

(22) PCT Filed: Aug. 19, 2011

(86) PCT No.: PCT/JP2011/068776
§ 371 (c)(1),
(2), (4) Date: Feb. 20, 2013

(87) PCT Pub. No.: WO2012/032917
PCT Pub. Date: Mar. 15, 2012

(65) Prior Publication Data
US 2013/0152699 A1 Jun. 20, 2013

(30) Foreign Application Priority Data

Sep. 8, 2010 (JP) ................................. 2010-200450

(51) Int. Cl.
*G01F 1/68* (2006.01)
*G01F 1/64* (2006.01)
*G01F 5/00* (2006.01)
*G01F 1/684* (2006.01)
*G01F 1/696* (2006.01)

(52) U.S. Cl.
CPC .. *G01F 1/64* (2013.01); *G01F 5/00* (2013.01); *G01F 1/684* (2013.01); *G01F 1/6965* (2013.01)
USPC .................................................... 73/204.24

(58) Field of Classification Search
USPC ................... 73/204.21, 118.2, 204.15; 702/50
See application file for complete search history.

(56) References Cited

U.S. PATENT DOCUMENTS

| 4,343,183 | A | | 8/1982 | Plapp |
| 5,184,500 | A | * | 2/1993 | Krema et al. ................. 73/23.2 |

(Continued)

FOREIGN PATENT DOCUMENTS

| JP | 55-114911 A | 9/1980 |
| JP | 62-170827 A | 7/1987 |

(Continued)

OTHER PUBLICATIONS

International Search Report including English translation dated Nov. 22, 2011 (Four (4) pages).

*Primary Examiner* — Jewel V Thompson
(74) *Attorney, Agent, or Firm* — Crowell & Moring LLP

(57) ABSTRACT

Provided is a highly accurate, highly reliable gas flow rate measurement device that provides an enlarged temperature range over which the resolution at a high temperature and at a low temperature can be increased to achieve high accuracy no matter whether the characteristics of a gas temperature detection element are nonlinear. The gas flow rate measurement device includes a plurality of resistors that are disposed in a gas flow path, a gas flow rate detection circuit that outputs a gas flow rate detection signal in accordance with the flow rate of a gas flowing in the gas flow path by detecting a current flowing in the resistors or by detecting a voltage generated in accordance with the current, and a gas temperature detection element 1 that detects the temperature of the gas in the gas flow path. The gas flow rate detection circuit includes signal conversion means for converting a signal output from the gas temperature detection element to a signal that has a predetermined maximum output and a predetermined minimum output and is linear within a predetermined temperature range.

8 Claims, 16 Drawing Sheets

(56) References Cited

U.S. PATENT DOCUMENTS

| | | | |
|---|---|---|---|
| 5,551,283 A | * | 9/1996 | Manaka et al. ............. 73/31.01 |
| 5,708,190 A | * | 1/1998 | Seefeldt et al. ............. 73/23.2 |
| 5,987,964 A | * | 11/1999 | Miremadi ................... 73/31.05 |
| 7,054,767 B2 | | 5/2006 | Eldridge |
| 2003/0154781 A1 | | 8/2003 | Matsumura |
| 2003/0212510 A1 | | 11/2003 | Gee |
| 2006/0037390 A1 | | 2/2006 | Nakano et al. |

FOREIGN PATENT DOCUMENTS

| | | |
|---|---|---|
| JP | 3-245025 A | 10/1991 |
| JP | 11-37815 A | 2/1999 |
| JP | 2003-75266 A | 3/2003 |
| JP | 2003-240620 A | 8/2003 |
| JP | 2006-58078 A | 3/2006 |
| JP | 2006-508372 A | 3/2006 |
| JP | 2010-7530 A | 1/2010 |

* cited by examiner

F I G . 1 3
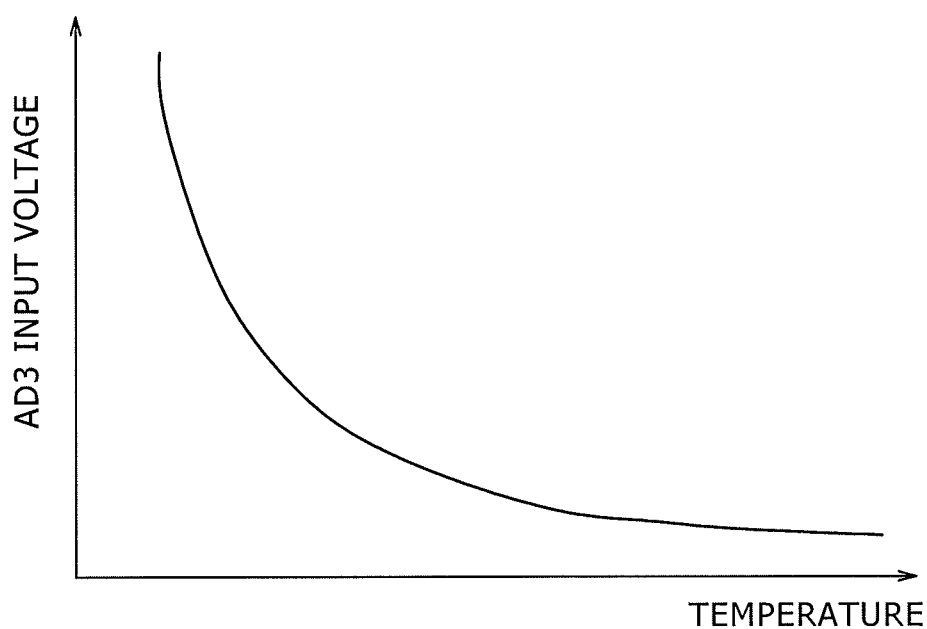

GAS FLOW RATE MEASUREMENT DEVICE

TECHNICAL FIELD

The present invention relates to a gas flow rate measurement device for measuring the intake air flow rate of an engine (internal combustion engine), and more particularly to a gas flow rate measurement device suitable for acquiring not only a gas flow rate but also a gas temperature detection signal.

BACKGROUND ART

In an automotive engine, it is necessary to measure an intake air flow rate in order to control a fuel injection amount. The intake air flow rate is measured, for instance, by a heat generation resistor type gas flow rate measurement device. It is preferred that the output signal of the heat generation resistor type gas flow rate measurement device vary insignificantly even when a temperature change occurs, namely, exhibit an insignificant temperature-dependent error. To reduce the temperature dependent error, it is necessary to correct a temperature dependent error in a gas flow rate detection signal in accordance with a gas temperature/substrate temperature detection signal.

A gas temperature dependent error is corrected, for instance, by a technology described in Japanese Unexamined Patent Application Publication No. Hei 11 (1999)-37815. This technology is exercised so that the temperature detection signal of a thermistor or other independent temperature sensor disposed in an intake air flow path is used to perform digital computations and correct the gas temperature dependent error. In general, the thermistor used as a temperature sensor has an advantage in that it is inexpensive. However, its resistance value is an exponential function of the reciprocal of a temperature. Therefore, the temperature detection signal is nonlinear with respect to the temperature. As the results in low resolution at a high temperature and at a low temperature, the accuracy of measurement is low.

Meanwhile, a platinum (Pt) resistor having good linear output characteristics can be used instead of the thermistor. However, the use of the platinum resistor, which is expensive, raises the price of the measurement device.

A configuration described in Japanese Unexamined Patent Application Publication No. 2003-75266 is adapted to improve the accuracy of gas temperature detection. More specifically, a linear gas temperature signal is output by connecting a resistor and a thermistor in parallel or by connecting a plurality of resistors in parallel or in series. However, such a configuration of a resistor-based analog circuit exhibits inadequate linearity and provides a narrow output range. Hence, the configuration lowers the level of convenience.

A device described in Japanese Unexamined Patent Application Publication No. 2010-7530 is disposed external to a gas temperature sensor to accurately diagnose a failure of the gas temperature sensor. However, the use of such an external device inevitably results in an increased cost.

CITATION LIST

Patent Literature

Patent Literature 1: Japanese Unexamined Patent Application Publication No. Hei 11 (1999)-37815
Patent Literature 2: Japanese Unexamined Patent Application Publication No. 2003-75266
Patent Literature 3: Japanese Unexamined Patent Application Publication No. 2010-7530

SUMMARY OF INVENTION

Technical Problem

When the above-described conventional technologies are employed, the gas temperature detection signal is acquired by installing a circuit including a plurality of resistors or by installing an external fault diagnosis device. This may cause an increase in adjustment manhours.

Further, if a gas temperature output is nonlinear because of the characteristics of a gas temperature detection element, resulting noise decreases accuracy and provides a lowered resolution at a high temperature and at a low temperature. This narrows the range of temperature that provides high accuracy. In addition, even if an appropriate combination of resistors is used to obtain a linear gas temperature signal, it is difficult to obtain a perfectly linear gas temperature signal. Moreover, even if a linear gas temperature signal is obtained, the use of the output range cannot be optimized.

Furthermore, if the gas temperature detection element is open-circuited, short-circuited, or otherwise defective, a diagnosis circuit is used. This results in an increased cost.

The present invention has been made in view of the above circumstances and has an object to provide a highly accurate, highly reliable gas flow rate measurement device that provides an enlarged temperature range over which high accuracy is achieved with increased resolution at a high temperature and at a low temperature no matter whether a gas temperature output is nonlinear.

Solution to Problem

The above-described problem can be solved by making correction with a digital circuit to derive a linear output from a nonlinear output of the gas temperature detection signal. This makes it possible to increase the resolution at a high temperature and at a low temperature, thereby enlarging the temperature range over which high accuracy is achieved. Further, as far as a constant output is generated at an extremely high temperature and at an extremely low temperature, the gas temperature detection element can be diagnostically checked for an open circuit, a short circuit, and other defects without installing a diagnosis circuit. Furthermore, the capacity for arithmetic processing can be decreased by optimizing a correction formula. In addition, as temperature-induced variations in circuit characteristics can also be corrected, variations in the gas temperature detection signal can be reduced.

Advantageous Effects of Invention

The present invention provides a gas flow rate measurement device having a highly accurate, highly reliable digital circuit that is capable of diagnostically checking a gas temperature detection element for an open circuit, a short circuit, and other defects in accordance with a gas temperature output while enlarging a temperature detection range with ease and maintaining a high degree of accuracy. In addition, as the present invention makes it possible to correct temperature-induced variations in circuit characteristics, variations in a gas temperature detection signal can be reduced.

BRIEF DESCRIPTION OF DRAWINGS

FIG. 13 shows output characteristics of the analog-to-digital converter AD3 14 input voltage according to the sixth embodiment.

DESCRIPTION OF EMBODIMENTS

Embodiments of a gas flow rate measurement device according to the present invention will now be described with reference to the accompanying drawings.

Figure 1:
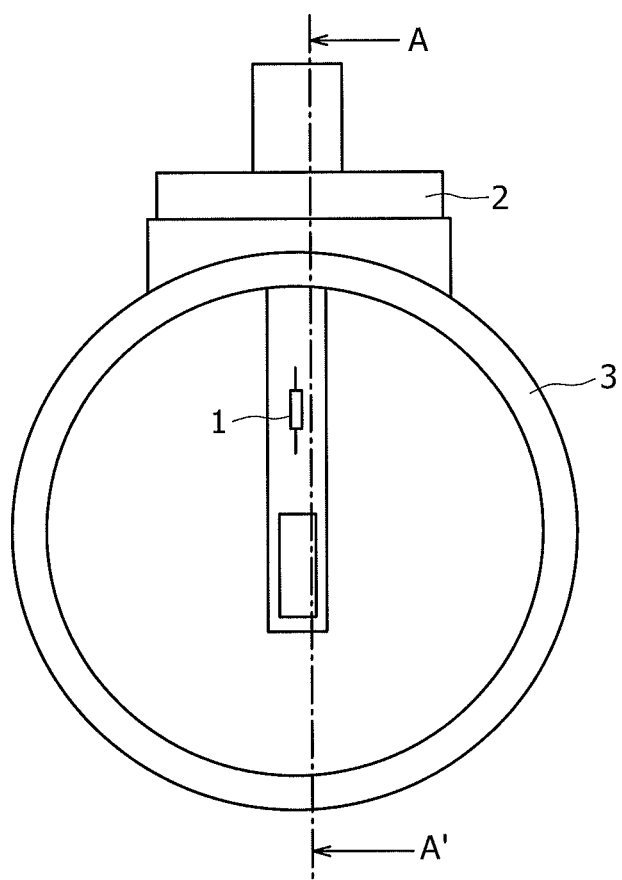
FIG. 1 is a diagram illustrating how a gas flow rate measurement device is mounted on a body.
Figure 2:
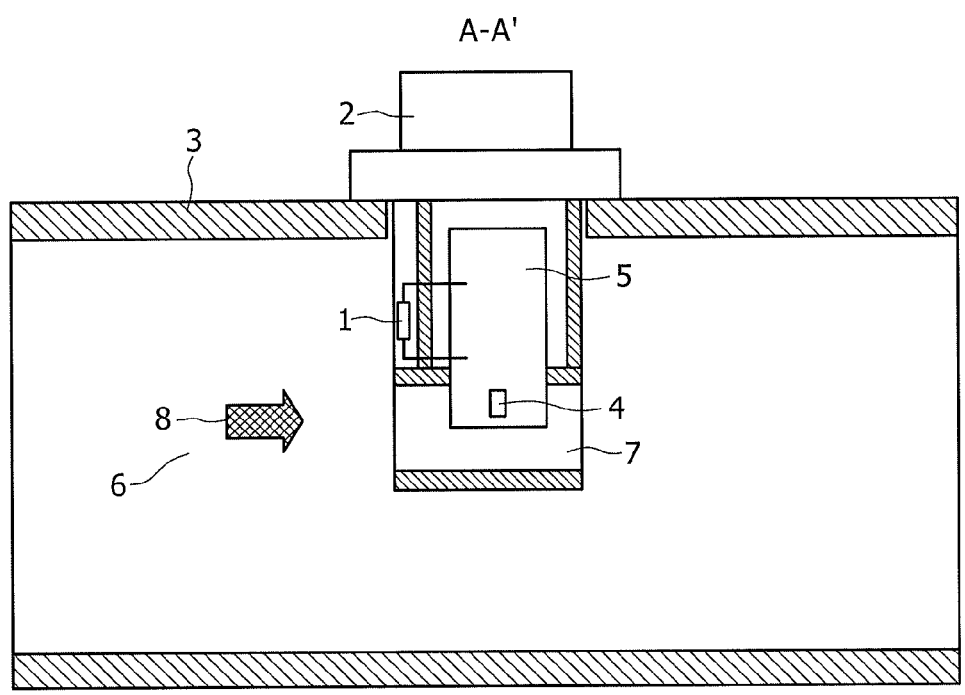
FIG. 2 is a cross-sectional view taken along the line A-A' of FIG. 1.
Figure 3:
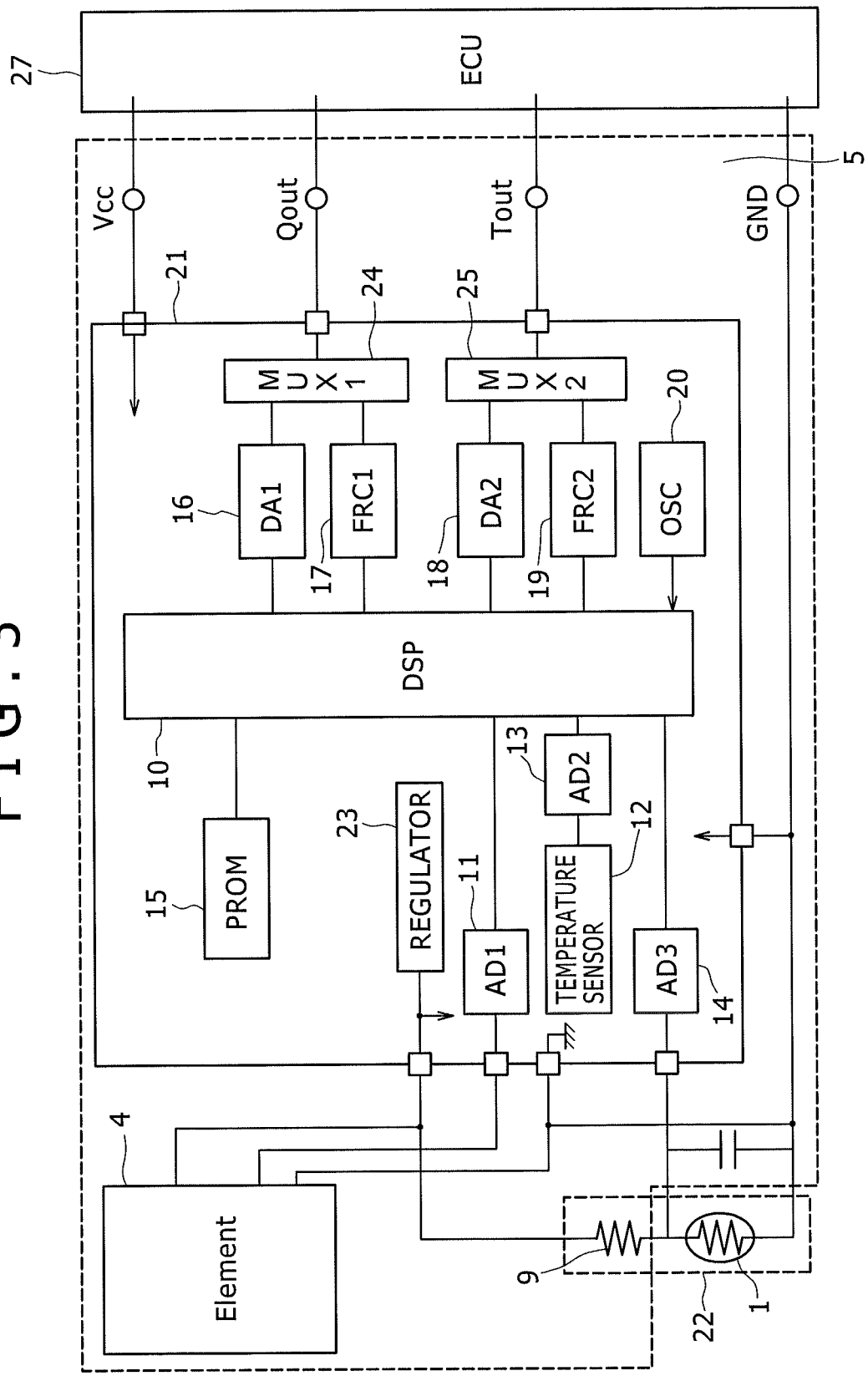
FIG. 3 is a circuit diagram of the gas flow rate measurement device according to a first embodiment of the present invention.

First of all, a first embodiment of the present invention will be described below with reference to FIGS. 1 to 7. FIG. 1 is a diagram illustrating how the gas flow rate measurement device 2 according to the first embodiment is mounted on a gas passage body 3. FIG. 2 is a cross-sectional view taken along the line A-A' of FIG. 1, which shows the gas flow rate measurement device 2 according to the first embodiment. FIG. 3 is a schematic diagram illustrating the configuration of a flow rate detection circuit of the gas flow rate measurement device 2 according to the first embodiment and the configuration of a gas temperature detection circuit 22.

Referring to FIG. 2, the gas flow rate measurement device 2 is mounted on the gas passage body 3, which forms the intake air flow path of an internal combustion engine, and is exposed to a gas flowing in a gas flow path. Hence, a gas temperature detection element (which may also be referred to as the thermistor or gas temperature measurement resistor) 1 is disposed upstream of the gas flow rate measurement device 2 and directly exposed to an intake fluid. A gas flow rate detection element 4 is disposed in an auxiliary passage 7. The gas flow rate detection element 4 is mounted on a substrate 5, and only a portion on which the gas flow rate detection element 4 is mounted is disposed in the auxiliary passage 7. The gas temperature detection circuit 22 shown in FIG. 3 is also mounted on the substrate 5 and isolated from the auxiliary passage 7. A gas temperature detected by the gas temperature detection element 1 is converted to a voltage signal by the gas temperature detection circuit 22 on the substrate 5 and input into an analog-to-digital converter AD3 14. An integrated circuit 21 includes a temperature sensor (substrate temperature sensor) 12 to detect the temperature of the substrate 5. Consequently, the gas temperature and the temperature of the gas flow rate measurement device 2 can be both detected.

Figure 4:
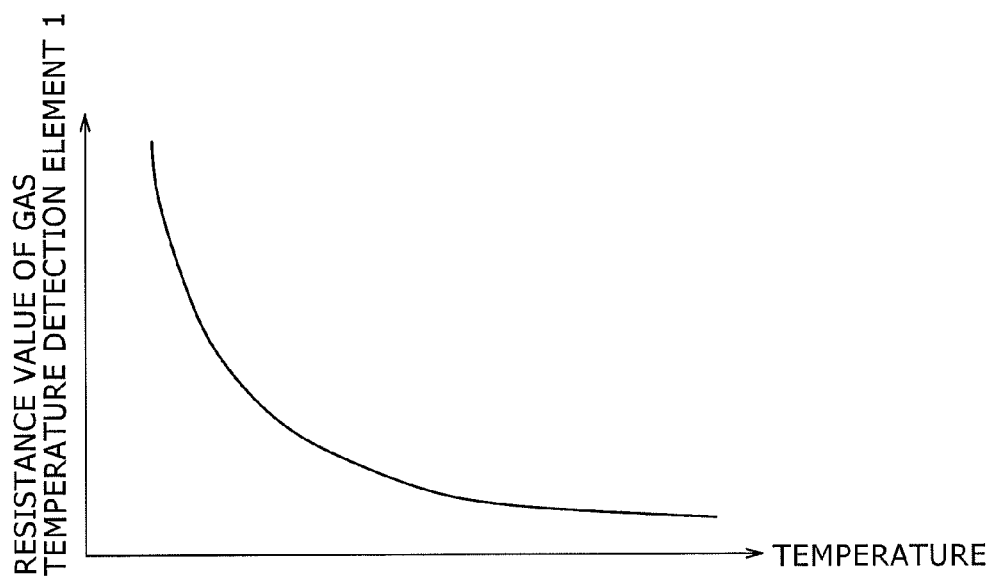
FIG. 4 shows temperature characteristics of the resistance value of a gas temperature detection element 1.

Referring to FIG. 3, the gas temperature detection circuit 22 is formed by series-connecting the gas temperature detection element 1 disposed in the intake air flow path to a fixed resistor 9 so that a constant voltage output from a regulator (reference power supply) 23 is supplied to the gas temperature detection circuit 22. In this instance, the characteristics of the gas temperature detection element 1 are the characteristics of a logarithmic function as shown in FIG. 4.

Figure 5:
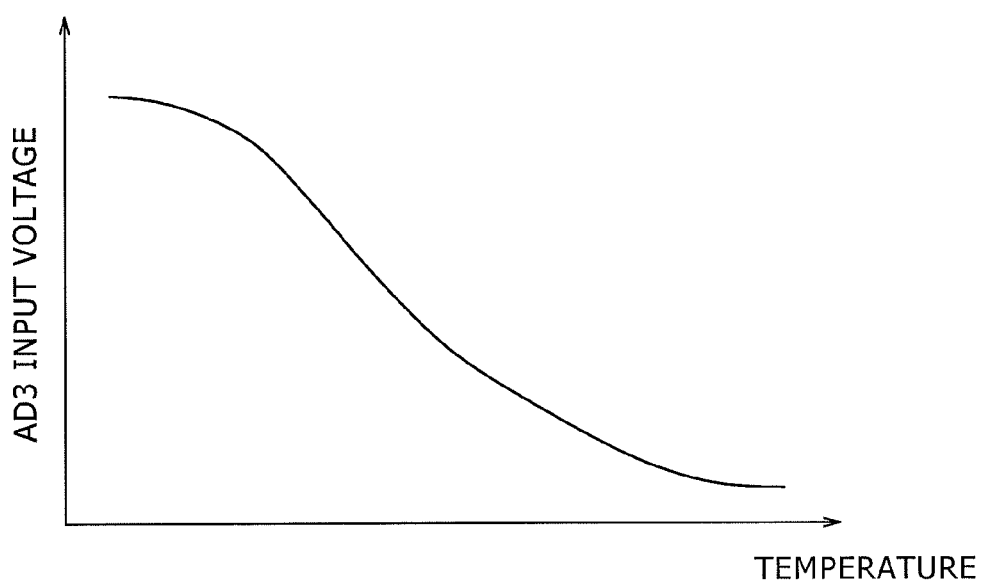
FIG. 5 shows output characteristics of an analog-to-digital converter AD3 14 input voltage according to the first embodiment.
Figure 6:
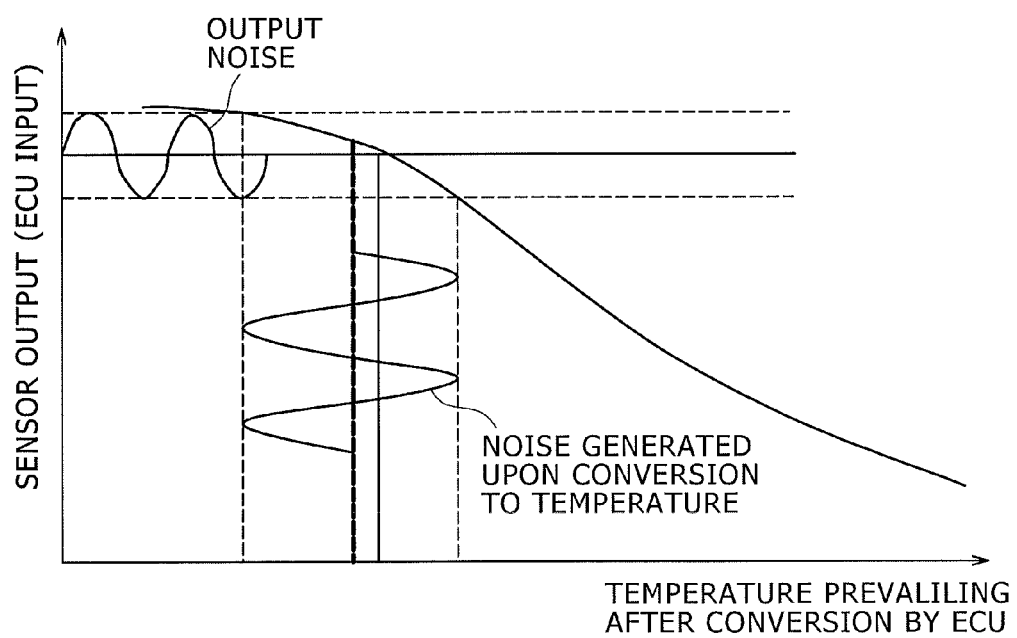
FIG. 6 shows the influence of error caused by noise generated upon conversion to temperature.

A divided voltage value that is obtained from the output voltage of the regulator 23 by the gas temperature detection element 1 and the fixed resistor 9 is input into a digital circuit as a gas temperature detection signal. The input voltage has nonlinear characteristics as shown in FIG. 5. Therefore, if the divided voltage value having nonlinear characteristics is conventionally used as is, decreased accuracy results because the resolution is low at a high temperature and at a low temperature. Further, if noise is superimposed upon an output when an engine control unit ECU 27 provides conversion to temperature in a situation where nonlinear characteristics prevail as shown in FIG. 6, the average value of the output deviates from an average value obtained upon conversion to temperature due to the nonlinearity of the sensor. Hence, a significant noise is generated upon conversion to temperature. Consequently, the temperature signal handled by the engine control unit ECU 27 cannot be maintained accurate.

Figure 7:
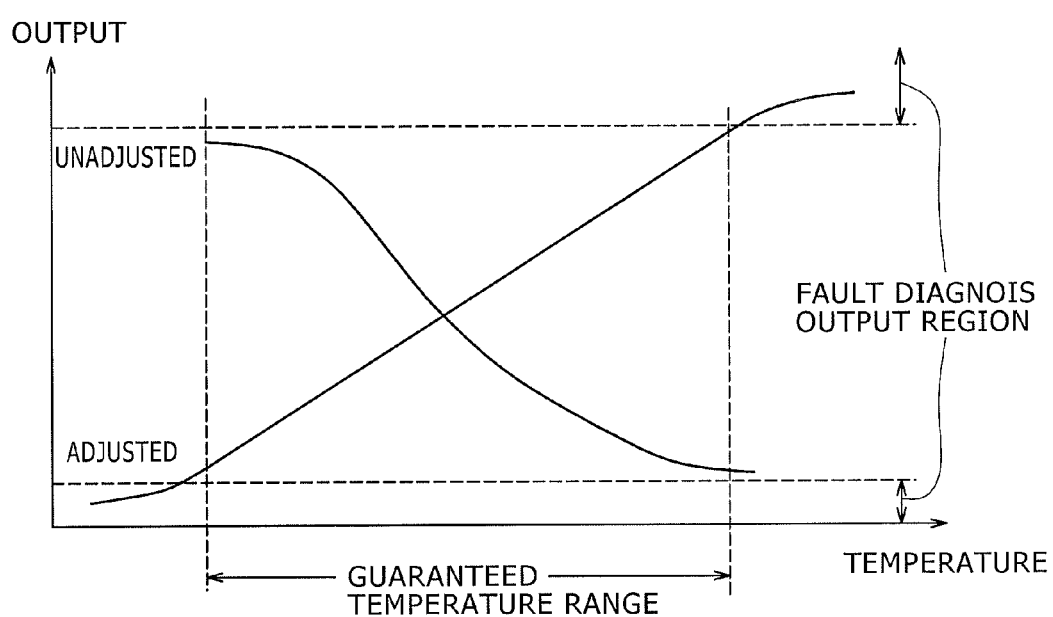
FIG. 7 is a diagram of characteristics conversion according to the first embodiment.

As such being the case, the characteristics of the gas temperature signal are corrected. First of all, the divided voltage value that is obtained from the voltage output from the regulator 23 by the gas temperature detection element 1 and the fixed resistor 9 is converted from an analog value to a digital value by the analog-to-digital converter AD3 14. A digital signal processor DSP 10 then performs a corrective arithmetic process on the digital value in accordance with a constant stored in a PROM 15. As a result, the output characteristics shown, for instance, in FIG. 7 are obtained. More specifically, the correction is made to obtain linear output characteristics that are represented by an upward-sloping curve within a guaranteed temperature range, which covers a predetermined maximum output and a predetermined minimum output and is within a predetermined temperature range. In this instance, if a digital signal (the value to be corrected) of the voltage input into the analog-to-digital converter AD3 14 is X, the corrected value is Y, and correction factors used for correction are $k_{t0}$ to $k_{t5}$, the use of a correction formula indicated by Equation (1) makes it possible to obtain adjusted output characteristics shown in FIG. 7.

$$Y = k_{t5}X^5 + k_{t4}X^4 + k_{t3}X^3 + k_{t2}X^2 + 4(k_{t1}+0.25)(X/2+k_{t0}) \quad (1)$$

The correction factors $k_{t0}$-$k_{t5}$ are stored in the PROM 15.

The digital value corrected as described above is converted to its analog equivalent by a digital-to-analog converter DA2 18 and output as a voltage signal. Meanwhile, if the digital value is converted to its analog equivalent by using a free-running counter FRC2 19 that converts a digital signal to a frequency signal, the gas temperature signal is output as a frequency signal. The choice between the digital-to-analog converter DA2 18 and the free-running counter FRC2 19 can be made in accordance with the setting of a multiplexer MUX2 25.

In the first embodiment, a chip thermistor or other similar semiconductor may be used in place of an axial part. In this instance, when a thermistor is mounted on the substrate 5, the cost can be reduced because there is no need to weld a lead wire for mounting the axial part.

As described earlier, when the digital circuit is used to make correction so that the nonlinear output of the gas temperature signal is converted to a linear output, the resolution at a high temperature and at a low temperature can be increased to enlarge the temperature range over which high accuracy is achieved. This also assures that a constant output is generated at an extremely high temperature and at an extremely low temperature. Hence, the gas temperature detection element can be diagnostically checked for an open circuit, a short circuit, and other defects without installing a diagnosis circuit. Further, the capacity for arithmetic processing can be decreased by optimizing the correction formula. In addition, as temperature-induced variations in circuit characteristics can also be corrected, variations in the gas temperature detection signal can be reduced.

Figure 16:
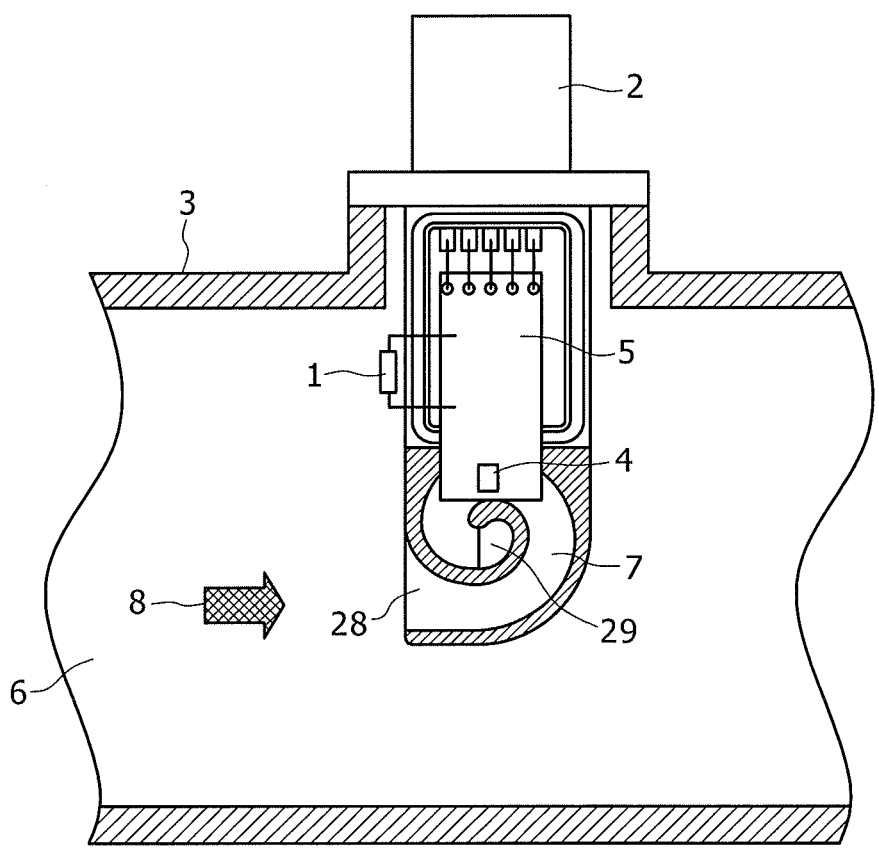
FIG. 16 is a diagram illustrating how the gas flow rate measurement device is mounted on the body.

In the first embodiment, the auxiliary passage 7 is shaped so that it is parallel to a main passage 6 as indicated in FIG. 2. Alternatively, however, the auxiliary passage 7 may be spiral-shaped as indicated in FIG. 16 so that a gas introduced into an auxiliary passage inlet 28 passes through the gas flow rate detection element 4 along the auxiliary passage 7 and goes out of an auxiliary passage outlet 29. Another alternative is to use a U-shaped or cc-shaped auxiliary passage in place of the spiral-shaped one.

A second embodiment of the present invention will now be described. When the gas flow rate measurement device 2, which is capable of detecting a gas flow rate and correcting a gas flow rate detection signal with a digital circuit, detects an intake gas temperature with the gas temperature detection element 1 and makes correction to provide increased accuracy with the digital circuit, a cost increase can be avoided by performing simplified computations within the digital circuit and minimizing the amount of data stored in the PROM 15. As such being the case, when Equation (2) is used in place of Equation (1), which is used in the first embodiment to perform a corrective process, in order to reduce a computational processing load, the number of computations can be minimized.

$$Y=16(k_{t5}*X/2+k_{t4})[X(X/2+k_{t3})\{X(X/2+k_{t2})+k_{t1}\}+ k_{t0}]-X \qquad (2)$$

In the above equation, the digital signal (the value to be corrected) input into the analog-to-digital converter AD3 14 is X, the corrected value is Y, and correction factors used for correction are $k_{t0}$ to $k_{t5}$. The correction factors $k_{t0}$-$k_{t5}$ are stored in the PROM 15.

Equation (2) significantly decreases the number of computations as compared to Equation (1), achieves substantially the same degree of correction accuracy as Equation (1), and makes correction to obtain the adjusted output shown in FIG. 7.

Alternatively, the correction can also be made by using an arbitrary function without using Equations (1) and (2). When the voltage supplied from the regulator 23 is divided, the characteristics of the voltage input into the analog-to-digital converter AD3 14 vary depending on whether the fixed resistor 9 is connected in series or in parallel and on the combination of resistors. An optimum correction formula for making relevant correction also varies with the characteristics of the voltage input into the analog-to-digital converter AD3 14. However, increasing the degree of the function used for correction results in a cost increase because it increases the amount of arithmetic processing and the capacity of the PROM. If, on the other hand, the degree of the function used for correction is unduly decreased, adequate accuracy cannot be achieved because it is difficult to make correction to obtain the adjusted characteristics shown in FIG. 7. Therefore, when an optimum, arbitrary function for correcting the unadjusted nonlinear characteristics shown in FIG. 7 to obtain the adjusted characteristics is used, correction can be made to output the gas temperature signal with high accuracy.

Figure 15:
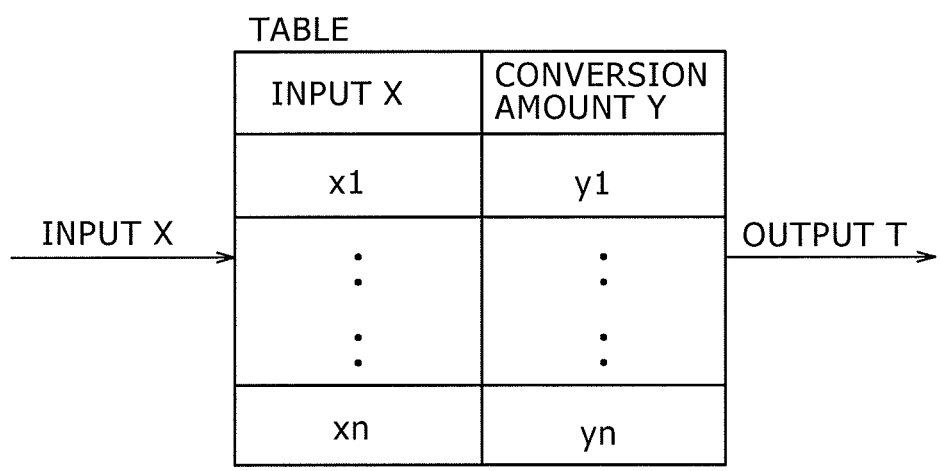
FIG. 15 shows a flow of table-based correction.

A third embodiment of the present invention will now be described. When the gas flow rate measurement device 2, which is capable of detecting a gas flow rate and correcting a gas flow rate detection signal with a digital circuit, detects an intake gas temperature with the gas temperature detection element 1 and makes correction to provide increased accuracy with the digital circuit, the gas temperature signal can be corrected by using a table shown in FIG. 15. The table shows the correlation between a digital value X input into the analog-to-digital converter AD3 and a conversion amount Y required for converting an intake air temperature to a target output voltage and includes a plurality of sets of data (n inputs between x1 and xn and n conversion amounts between y1 and yn). A converted output T is calculated by adding the conversion amount Y, which is calculated from the table, to the input X. An increase in the number n of data sets in the table increases the correction accuracy, but increases the size of data written into the PROM 15, thereby increasing the cost. If, on the contrary, the number n of data sets is small, the size of data written into the PROM 15 is small. This makes it possible to avoid a cost increase, but decreases the correction accuracy. Hence, the number n of data sets used in the table needs to be optimized in accordance with the adopted temperature range. When the above-described table is used for correction purposes, the amount of arithmetic processing can be reduced as compared to a function-based correction method.

Figure 8:
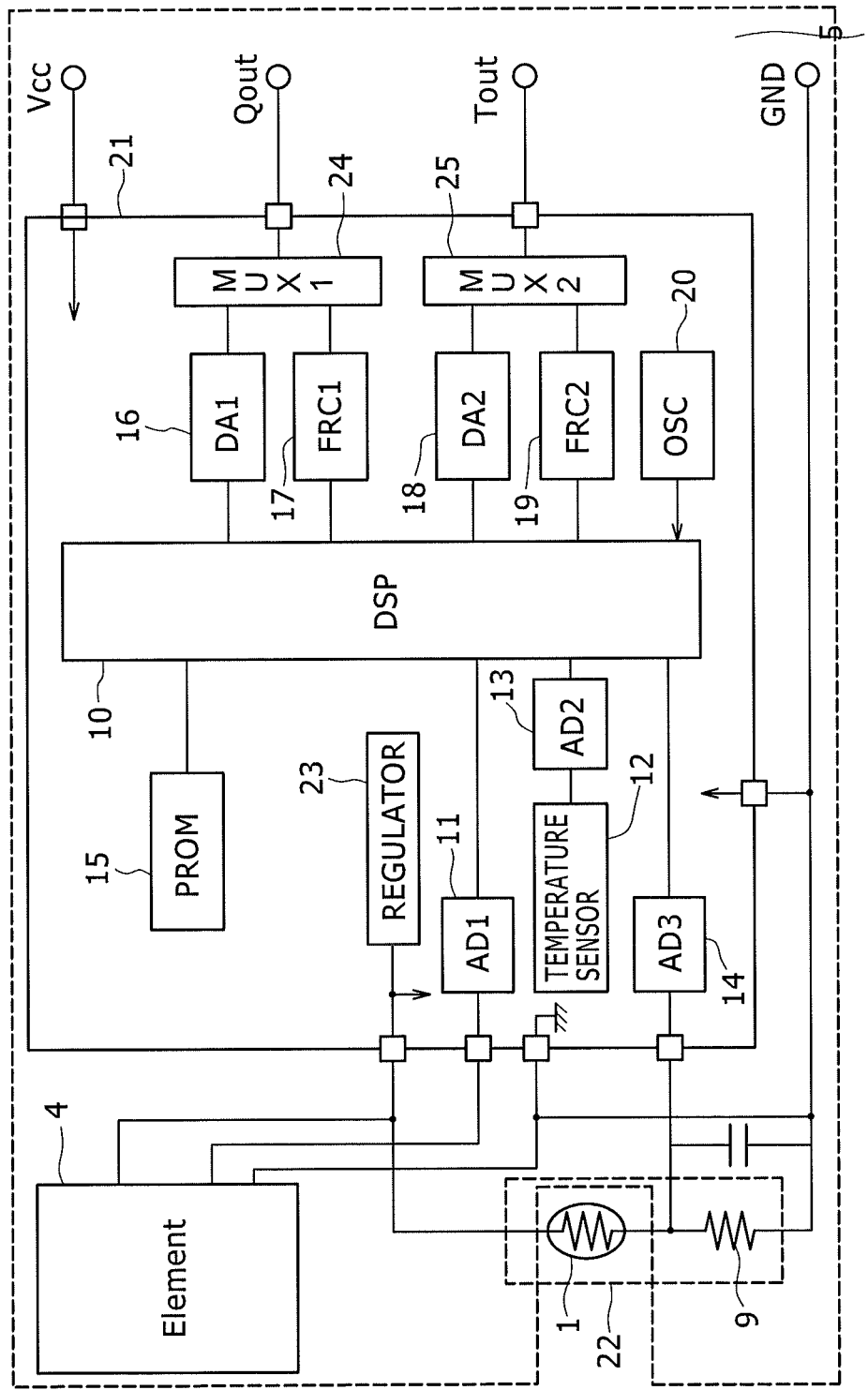
FIG. 8 is a circuit diagram of the gas flow rate measurement device according to a fourth embodiment of the present invention.
Figure 9:
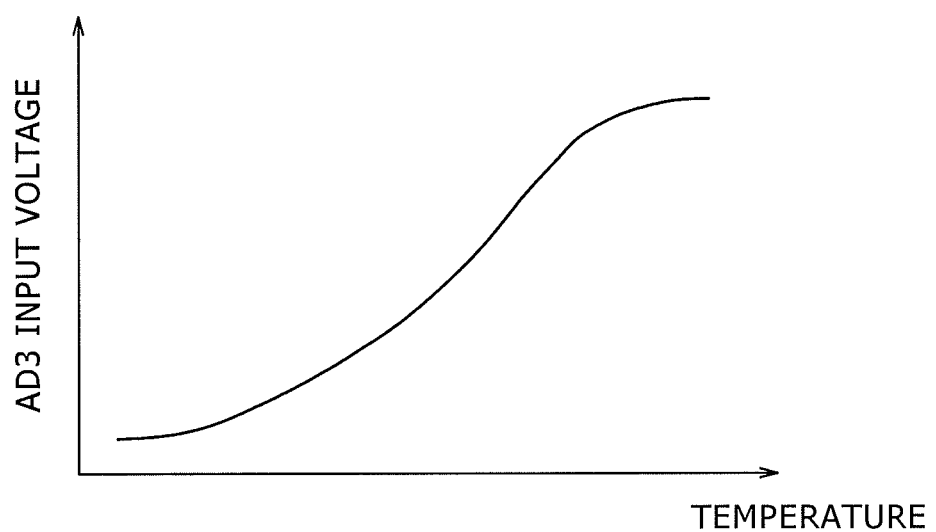
FIG. 9 shows output characteristics of the analog-to-digital converter AD3 14 input voltage according to the fourth embodiment.
Figure 10:
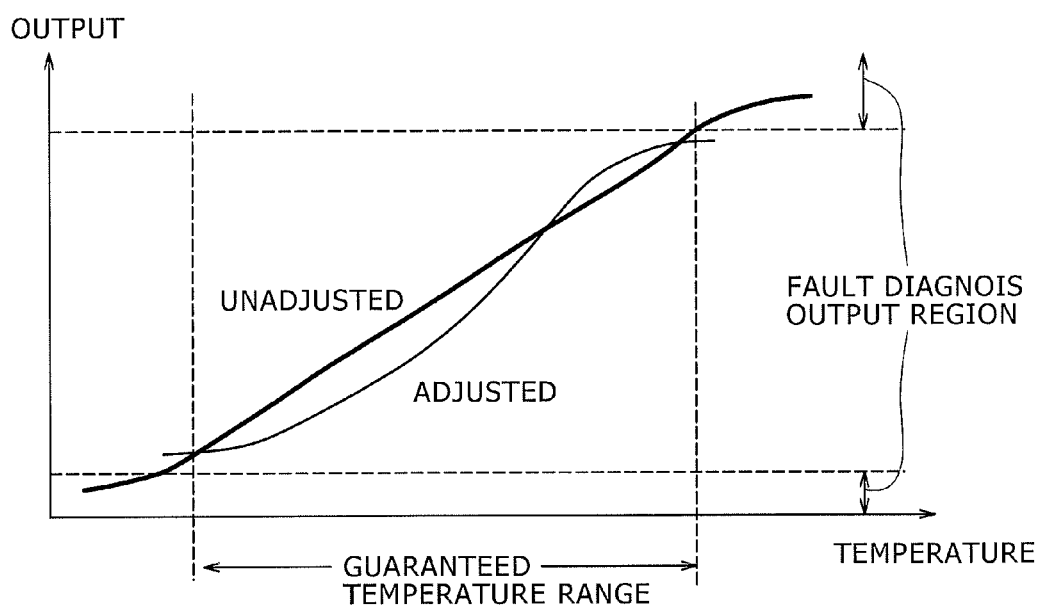
FIG. 10 is a diagram of characteristics conversion according to the fourth embodiment.

A fourth embodiment of the present invention will now be described with reference to FIG. 8. A circuit mounted on the substrate 5 shown in FIG. 8 is the same as the circuit according to the first embodiment. Referring to FIG. 8, the gas temperature detection element 1 is series-connected to the fixed resistor 9, and a constant voltage output from the regulator 23 is supplied to the gas temperature detection circuit 22. A voltage input into the analog-to-digital converter AD3 14, which is a divided voltage value obtained from the output voltage of the regulator 23 by the gas temperature detection element 1 and the fixed resistor 9, is input into a digital circuit as a gas temperature detection signal. In this instance, the positions of the gas temperature detection element 1 and the fixed resistor 9 differ from those in the first embodiment. In the first embodiment, the gas temperature detection element 1 is connected to the output side of the regulator 23, and the fixed resistor 9 is connected to the ground side of the regulator 23. In the fourth embodiment, on the other hand, the fixed resistor 9 is connected to the output side of the regulator 23, and the gas temperature detection element 1 is connected to the ground side of the regulator 23. This ensures that the voltage input into the analog-to-digital converter AD3 14, which is a gas temperature output, is nonlinear in characteristics but represented by an upward-sloping curve as shown in FIG. 9. As shown in FIG. 10, adjusted target output characteristics are equivalent to those of the first embodiment. However, as the characteristics of the voltage input into the analog-to-digital converter AD3 14 are represented by an upward-sloping curve, the difference between the adjusted target output and the unadjusted output is reduced. Therefore, the amount of correction can also be reduced. This makes it possible to reduce the load on an arithmetic process and decrease an overflow within the arithmetic process. Consequently, an arithmetic error and an erroneous cancellation of significant digits can be reduced.

Figure 11:
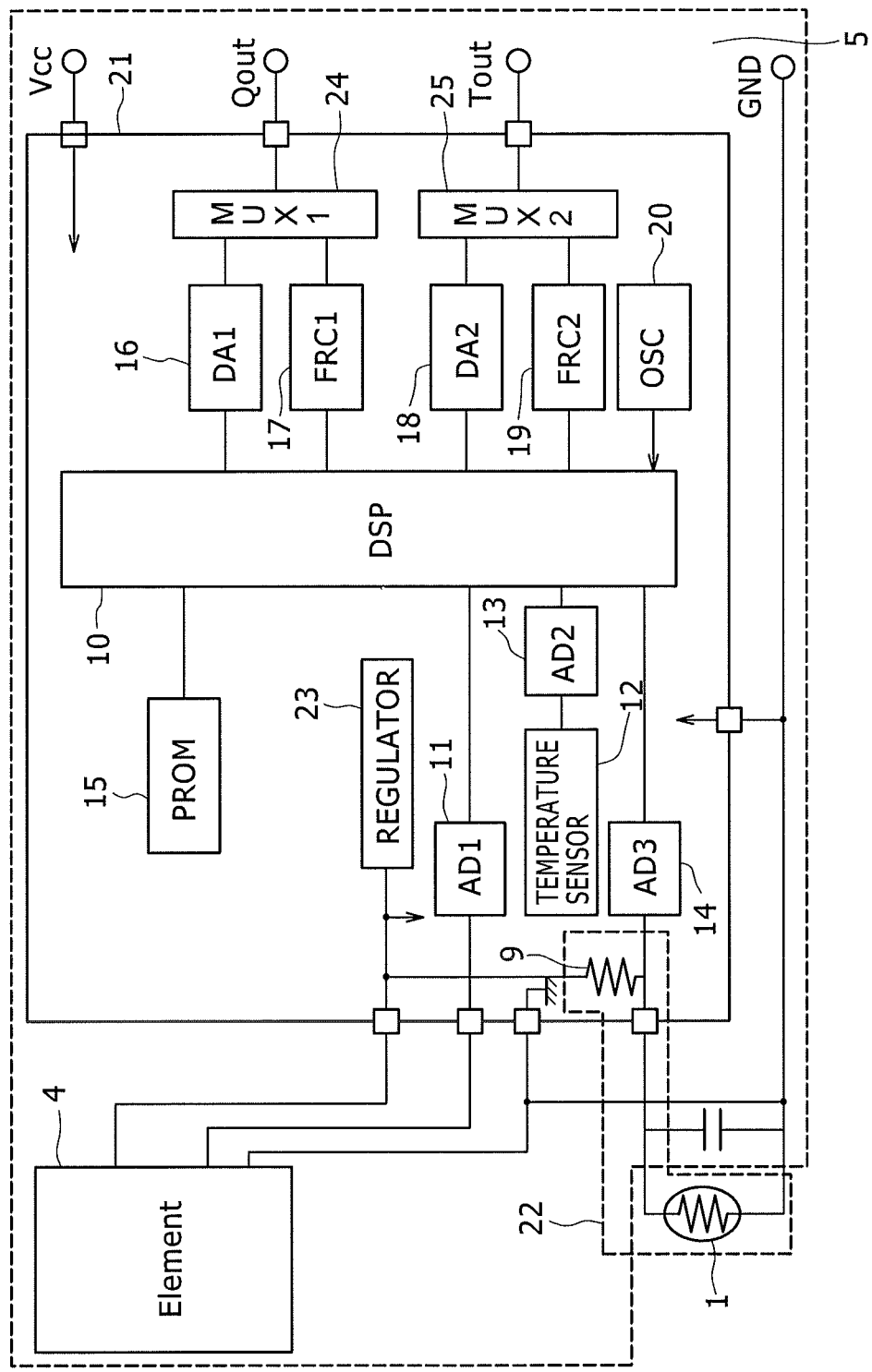
FIG. 11 is a circuit diagram of the gas flow rate measurement device according to a fifth embodiment of the present invention.

A fifth embodiment of the present invention will now be described. Referring to FIG. 11, the gas temperature detection element 1 is series-connected to the fixed resistor 9, and a constant voltage output from the regulator 23 is supplied to the gas temperature detection circuit 22. A voltage input into the analog-to-digital converter AD3 14, which is a divided voltage value obtained from the output voltage of the regulator 23 by the gas temperature detection element 1 and the fixed resistor 9, is input into a digital circuit as a gas temperature. In other words, the fifth embodiment uses a potential difference across the gas temperature detection element 1 as an output signal. In this instance, the fixed resistor 9 is not mounted on the substrate 5, but is disposed in the integrated circuit 21. Although the characteristics of the fifth embodiment are equivalent to those of the first embodiment, the fifth embodiment permits cost reduction as the fixed resistor 9 is not mounted on the substrate 5 but is disposed in the integrated circuit 21.

Figure 12:
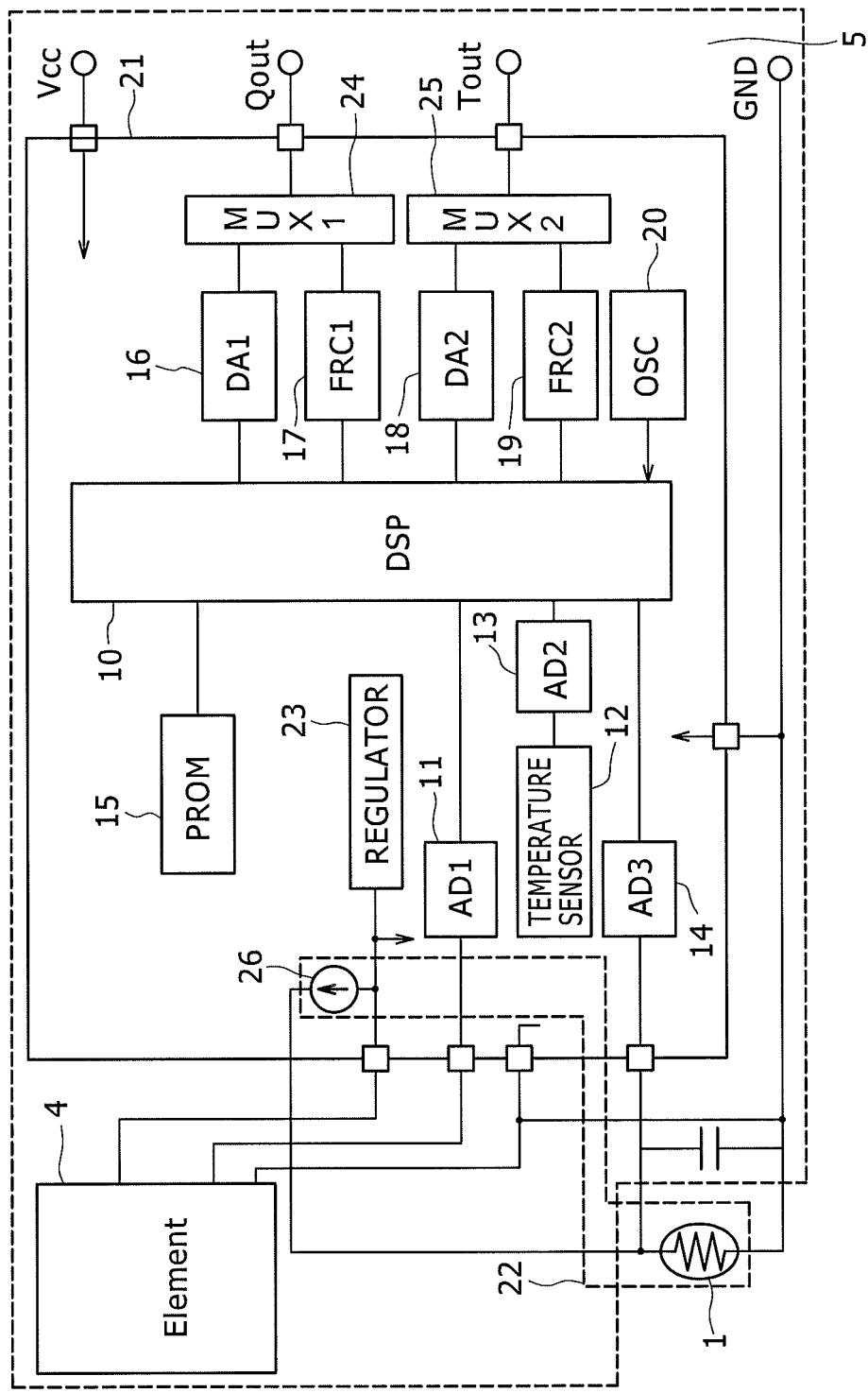
FIG. 12 is a circuit diagram of the gas flow rate measurement device according to a sixth embodiment of the present invention.
Figure 14:
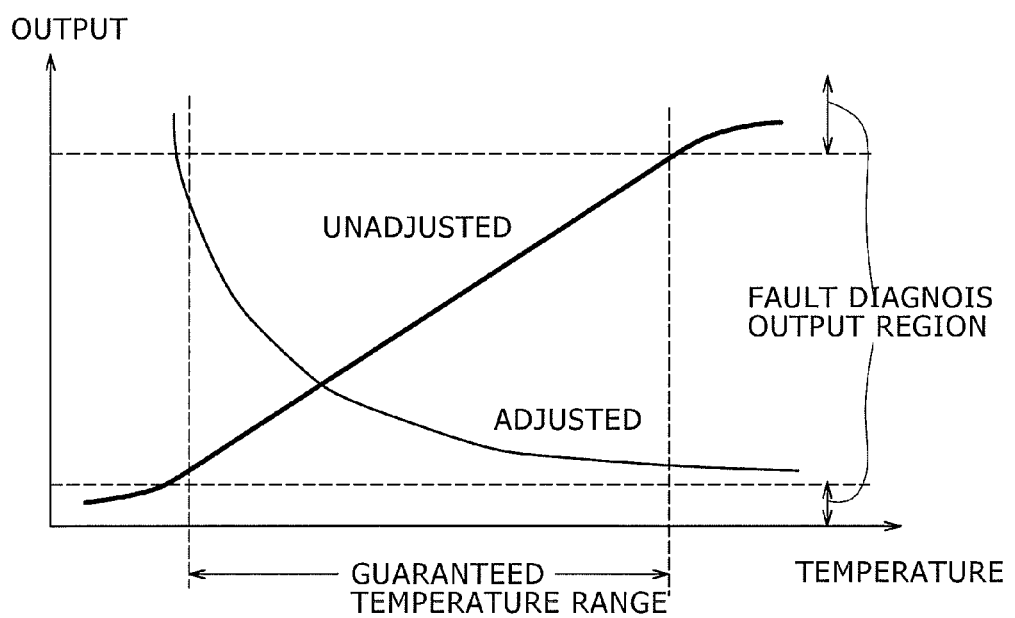
FIG. 14 is a diagram of characteristics conversion according to the sixth embodiment.

A sixth embodiment of the present invention will now be described with reference to FIGS. 12 and 13. The sixth embodiment differs from the first embodiment in that a constant current source 26 is used in place of the fixed resistor 9 to read the voltage input into the analog-to-digital converter AD3 14 as a gas temperature signal and make digital correction. In this instance, the characteristics of the voltage input into the analog-to-digital converter AD3 14 are the characteristics of a logarithmic function as shown in FIG. 13. The voltage input into the analog-to-digital converter AD3 14, which is an unadjusted gas temperature signal, is digitally corrected to obtain an adjusted output as shown in FIG. 14. Supplying a constant voltage changes the current flowing to the gas temperature detection element 1 in accordance with the resistance value of the gas temperature detection element 1, thereby increasing the influence of self-heating of the gas temperature detection element 1. However, the use of the constant current source 26 ensures that a constant current flows to the gas temperature detection element 1. Thus, the current flowing to the gas temperature detection element 1 remains unchanged even when the resistance value of the gas temperature detection element 1 changes. This makes it possible to reduce the influence of self-heating.

A seventh embodiment of the present invention will now be described with reference to FIG. 3. When the gas flow rate measurement device 2, which is capable of detecting a gas flow rate and correcting a gas flow rate detection signal with a digital circuit, detects an intake gas temperature with the gas temperature detection element 1 and makes correction to provide increased accuracy with the digital signal processor DSP 10 in the digital circuit, the influence on the temperature characteristics of a detection circuit is corrected. The temperature information about the substrate 5 can be acquired by the temperature sensor 12 in the integrated circuit 21 on the substrate 5. Further, the digital signal processor DSP 10 makes correction by using Equation (3).

$$Y = k_{t5}X^5 + k_{t4}X^4 + k_{t3}X^3 + k_{t2}X^2 + 4(k_{ts}T + k_{t1} + 0.25)(X/2 + k_{tz}T + k_{t0}) \quad (3)$$

In the above equation, the digital signal (the value to be corrected) input into the analog-to-digital converter AD3 14 is X, the output of the temperature sensor 12 in the integrated circuit (the temperature of the substrate 5) is T, the corrected value is Y, and correction factors used for correction are $k_{t0}$ to $k_{t5}$, $k_{ts}$, and $k_{tz}$. The correction factors $k_{t0}$ to $k_{t5}$, $k_{ts}$, and $k_{tz}$ are stored in the PROM 15.

Hence, it is possible to correct not only the gas temperature signal but also the influence on the temperature characteristics of the detection circuit. Consequently, enhanced accuracy can be achieved.

LIST OF REFERENCE SIGNS

1 ... Gas temperature detection element
2 ... Gas flow rate measurement device
3 ... Gas passage body
4 ... Gas flow rate detection element
5 ... Substrate
6 ... Main passage
7 ... Auxiliary passage
8 ... Air flow
9 ... Fixed resistor
10 ... Digital signal processor DSP
11 ... Analog-to-digital converter AD1
12 ... Temperature sensor in integrated circuit
13 ... Analog-to-digital converter AD2
14 ... Analog-to-digital converter AD3
15 ... PROM
16 ... Digital-to-analog converter DA1
17 ... Free-running counter FRC1
18 ... Digital-to-analog converter DA2
19 ... Free-running counter FRC2
20 ... Transmitter
21 ... Integrated circuit
22 ... Gas temperature detection circuit
23 ... Regulator
24 ... Multiplexer MUX1
25 ... Multiplexer MUX2
26 ... Constant current source
27 ... Engine control unit ECU
28 ... Auxiliary passage inlet
29 ... Auxiliary passage outlet

The invention claimed is:

1. A gas flow rate measurement device comprising:
a plurality of resistors that are disposed in a gas flow path;
a gas flow rate detection circuit that outputs a gas flow rate detection signal in accordance with the flow rate of a gas flowing in the gas flow path by detecting a current flowing in the resistors or by detecting a voltage generated in accordance with the current; and
a gas temperature detection element that detects the temperature of the gas in the gas flow path;
wherein the gas flow rate detection circuit includes signal conversion means for converting a signal output from the gas temperature detection element to a signal that has a predetermined maximum output and a predetermined minimum output and is linear within a predetermined temperature range.

2. The gas flow rate measurement device according to claim 1, wherein the gas temperature detection element is connected to a reference power supply in series with a fixed resistor; wherein the power supply voltage of the reference power supply is divided by the gas temperature detection element and the fixed resistor; and wherein the divided voltage is used as an output signal.

3. The gas flow rate measurement device according to claim 2, wherein the fixed resistor is mounted on a substrate on which the gas flow rate detection circuit is mounted.

4. The gas flow rate measurement device according to claim 1, wherein the gas temperature detection element is connected to a constant current source to use a potential difference across the gas temperature detection element as an output signal.

5. The gas flow rate measurement device according to claim 1, wherein the gas temperature detection element is formed by a thermistor.

6. The gas flow rate measurement device according to claim 1, wherein a signal output from the signal conversion means is a digital signal output from an analog-to-digital converter; wherein the analog-to-digital converter is disposed in an integrated circuit; and wherein the integrated circuit includes a digital-to-analog converter that converts the output signal of the signal conversion means to an analog signal.

7. The gas flow rate measurement device according to claim 6, wherein the integrated circuit includes a substrate temperature senor that measures the temperature of the substrate; and wherein the signal conversion means converts an output signal in accordance with a digital signal output from the analog-to-digital converter and with a signal output from the substrate temperature sensor.

8. The gas flow rate measurement device according to claim 6, wherein the fixed resistor is disposed in the integrated circuit.

* * * * *